United States Patent Office 2,747,569
Patented May 29, 1956

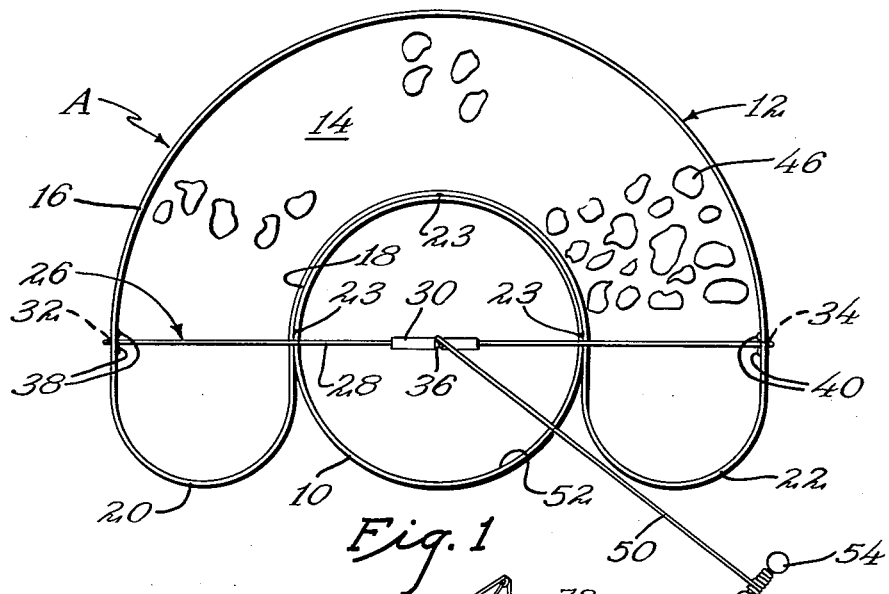
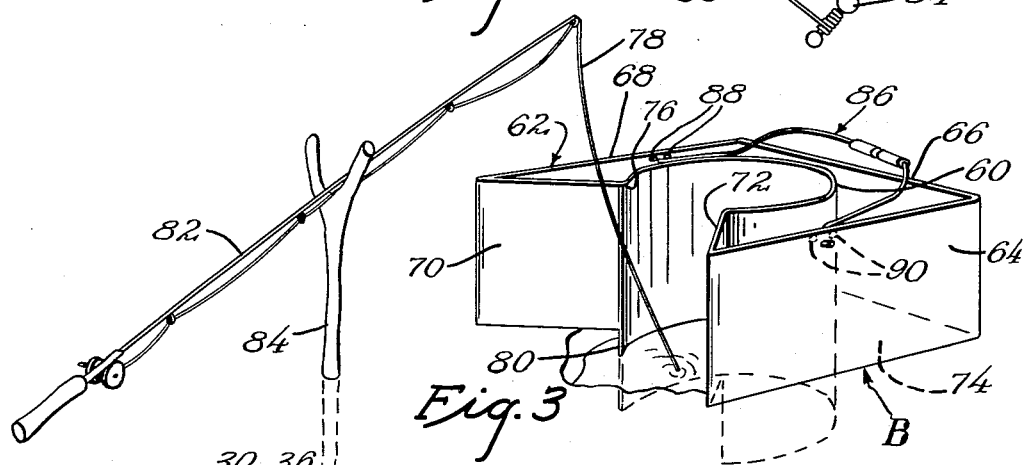
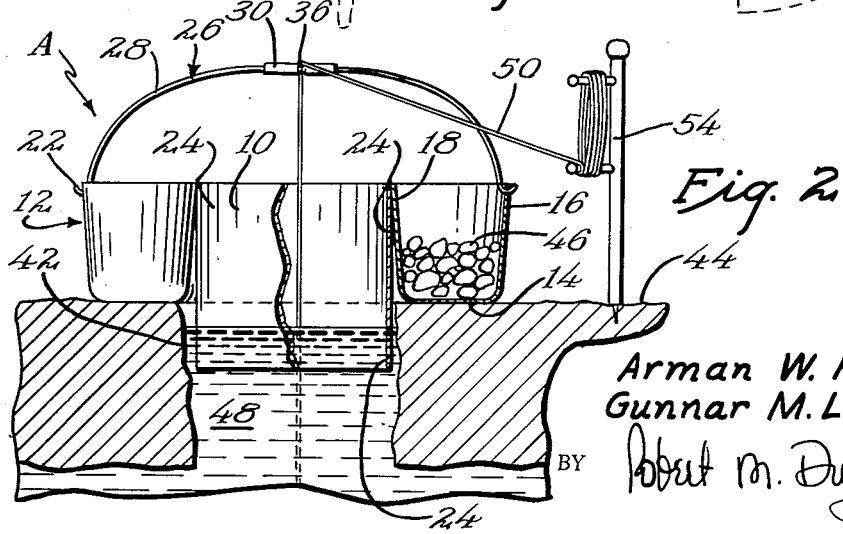

2,747,569

FISHERMAN'S DEICER

Arman W. Holm and Gunnar M. Larson, St. Paul, Minn.

Application January 23, 1952, Serial No. 267,716

9 Claims. (Cl. 126—367)

This invention relates to a heating device and pertains more particularly to a device for preventing the refreezing of holes cut in the ice for winter fishing.

In northern climates ice fishing has become quite popular, the custom being to chop or cut a hole through the ice in order to drop a fishing line therethrough. However, the chopped hole has a tendency to freeze over unless constant vigilance is exercised, which of course is an annoying feature of the sport, especially when warming huts are used and remote, scattered lines remain unattended between checking intervals.

Accordingly, the principal object of the invention is to provide an inexpensive device that will effectively prevent refreezing of holes cut for the foregoing purpose.

One feature of the invention resides in the provision of a unitary structure provided with a receptacle portion adapted to contain a combustible, such as burning charcoal, the heat from which is conducted via a downwardly extending element into the water within the cut hole to thereby warm the water and prevent its freezing.

Fortuitously, the invention also includes a secondary purpose, that being to furnish warmth to the fisherman himself, when desired, as the metallic surfaces of the device radiate heat to the ambient air as well as conducting heat to the water.

Another feature of the invention resides in the fact that the device is quite compact, fitting readily into the trunk of a car, and the receptacle portion thereof may conveniently be used in transit for the carrying of fishing tackle and bait.

Further, still another feature of the invention lies in the provision of a handle for carrying the device which handle may be used in an upright position to support the fishing line.

Other advantages will become apparent in the course of studying the structural embodiments presented for the purpose of illustration in the following description and the accompanying drawing, in which:

Figure 1 is a plan view of one form of our device;

Figure 2 is an elevational view corresponding to Figure 1, parts thereof being shown in section; and Figure 3 is a perspective view of a second embodiment representative of the invention.

Referring first to Figures 1 and 2, the heating device is represented generally by the letter A and includes a centrally disposed cylindrical member 10 and a receptacle 12. The receptacle 12 is substantially U-shaped, comprising a bottom wall 14 provided with upstanding side walls 16 and 18, the side walls being joined with each other by means of the curved ends 20 and 22. The member 10 may be a section of pipe having its upper end connected, as by spot welding, denoted at several points 23, to the upper edge of the sloping wall 18 of the receptacle 12. From Figure 2, it will be seen that the pipe member 10 has a flange portion 24 extending beneath the level of the receptacle's bottom wall 14. As depicted, the flange 24 is an integral continuation of the member 10.

A handle 26 consisting of a bail 28 and a grip element 30, preferably of heat insulative material such as wood or plastic, is anchored to opposite sides of the wall 16, the bail 28 extending through apertures 32 and 34 in the wall 16. For a purpose presently to be explained, the element 30 is circumferentially grooved at 36. Also, as will hereinafter be made clear, a pair of slightly spaced, rounded projections 38 and 40 are positioned on either side of and above the apertures 32 and 34, these projections 38 and 40 serving to retain the handle 26 in an upstanding manner when the bail 28 is flexed into a medial position relative to the projections.

In use, the device A is placed over an opening 42 cut or chopped in the ice 44, the bottom wall 14 resting upon the upper surface of the ice circumjacent the hole or opening 42. A suitable combustible 46 is placed in the receptacle 12 and ignited. It will be observed that the lower end of the member 10, i. e. the flange 24 depends into the water 48 and in that the parts comprising the device A are of metal, sufficient heat will be transferred to this flange 24 and thence to the water 48 to prevent the water from freezing.

In the embodiment bearing the letter A, the fishing line should not touch any portion of the members 10 and 12, for there is the likelihood that the line will be burned by the hot metal constituting these members. A facile way for preventing any undesired burning of the line is provided by the handle 26, and as illustrated a fishing line 50 is draped over the grip element 30, the line engaging the groove or notch 36. Of course, the projections 38 and 40 maintain the handle 26 in a straddling relationship with the passage or bore 52 through the member 10. The line 50 may be conveniently anchored to a fish stick 54 of common construction which has been forced into the ice 44.

As explained above, when using the device A, one must be careful not to burn through the fishing line, and in our second embodiment labeled B, we disclose an arrangement that obviates this possibility. The device B is generally similar to the previously described modification, comprising an arcuate member 60 centrally disposed relative to a receptacle 62. In this embodiment it will be seen that the member 60 forms the inner wall of the receptacle, the outer wall being composed of a plurality of panels 64, 66, 68, 70 and 72 which are in an upwardly directed relation with respect to a bottom wall 74. It is not thought necessary to describe in detail the cuts and welds necessary to form the aforesaid walls, but it might be mentioned that the panels 70 and 72 can be integral with the member 60, if desired, flaring outwardly as shown, to form a longitudinal or vertical entrance or opening at 76 for the accommodation of a fishing line 78. Since the opening 76 extends the full length of the member 60, it will be apparent that there is no danger of the line 78 touching any portion of the metallic structure generally designated by the letter B. As in embodiment A, the instant modification B is constructed with a depending flange 80 for conducting heat into the water.

Because of the opening 76, a wider variety of fishing gear may be utilized with the device B than with the construction A. For example, a rod and reel 82 may be employed, supported intermediate its ends by a Y-shaped stick 84; or the fish stick 54 may be used; or almost any type of device for anchoring the line 78 may be utilized. Thus, the device B possesses greater adaptability for the various types of tackle usually encountered.

As with the device A, the invention envisages the employment of a handle 86 corresponding in function to the handle 26. Projections 88 and 90 are also shown which are identical to the projections 38 and 40, serving the purpose of retaining the handle 86 in an upstanding condition, should such a position be desired for any reason. However, the opening 76 is thought to eliminate the greatest need for having the handle held in an upstanding relation, although such relation is beneficial in keeping the fishing line away from the ice forming the rim of the hole to which the line is apt to freeze.

In accordance with the patent statutes, we have described the principles of construction and operation of our fisherman's deicer, and while we have endeavored to set forth the best embodiments thereof, we desire to have it understood that these are only illustrative thereof, and that obvious changes may be made within the scope of the following claims without departing from the spirit of our invention.

We claim:

1. A heating device for preventing the refreezing of holes cut in the ice for winter fishing comprising in combination a fire pot receptacle for containing a heat supporting medium, and an open ended, thin downwardly depending metal flange having an upper portion in partial heat conductive relation with said receptacle, said receptacle extending laterally outward from said flange.

2. A heating device for preventing the refreezing of holes cut in the ice for winter fishing comprising a combustion receptacle provided with bottom and side walls, and a thin downwardly depending metal flange carried by said receptacle and extending below the bottom of said receptacle, said flange forming an opening extending from top to bottom through which a fishing line may extend and said receptacle extending outwardly of, and embracing a portion of the periphery of the flange extending above the bottom of said receptacle to thereby transfer heat to the portion of said flange embraced thereby.

3. A heating device for preventing the refreezing of holes cut in the ice for winter fishing comprising a centrally disposed arcuate member of heat conductive material provided with a side opening extending from top to bottom through which a fishing line may extend, and receptable means for combustible material encircling the unopen side of said arcuate member and extending outwardly therefrom, said receptacle means having a bottom arranged to rest upon the ice at an elevation above the lower end of said arcuate member.

4. A heating device for preventing the refreezing of holes cut in the ice for winter fishing comprising a cylindrical member of heat conductive material having an opening therethrough extending from top to bottom through which a fishing line may extend, and a U-shaped combustion receptacle in partial contiguous heat conductive relation with the upper portion only of said member, the bottom of said receptacle being above the lower end of said cylindrical member and below the upper end thereof.

5. The structure described in claim 4 in which the combustion receptacle is provided with a downwardly and outwardly flaring inner wall joined at its upper edge to the upper end of said cylindrical member.

6. The structure of claim 4 in which the receptacle is equipped with handle means secured thereto, said handle extending across said cylindrical member to support a fishing line extending therethrough.

7. A heating device of the character described comprising a split tubular member open at its ends, and at one side, and receptacle means encircling said tubular member and equipped with side walls connecting with said member adjacent the side opening of said member, said receptacle also having a bottom wall upon which the device may rest and arranged at an elevation above the lower end of said member.

8. The structure described in claim 7 in which the side walls extend outwardly from said member and continue in spaced relation with said member around the periphery of said bottom wall, thereby forming a receptacle encircling the major portion of said member.

9. A heating device for preventing the refreezing of holes cut in the ice for winter fishing comprising in combination a substantially U-shaped receptacle for containing a heat supplying medium, a downwardly depending flange in heat conductive relation extending below said receptacle forming an opening extending from top to bottom through which a fishing line may extend, a handle engaging opposite sides of the receptacle, said handle having a portion thereof of heat insulation material which is provided with a groove designed to engage a fishing line substantially centrally of said opening, and means for holding the handle in a substantially upright position with said handle portion over said opening.

References Cited in the file of this patent

UNITED STATES PATENTS

| Number | Name | Date |
|---|---|---|
| 379,482 | Matthews | Mar. 13, 1888 |
| 463,781 | Tew | Nov. 24, 1891 |
| 608,291 | Kemp | Aug. 2, 1898 |
| 806,307 | Townsend | Dec. 5, 1905 |
| 1,237,994 | Barrett | Aug. 21, 1917 |
| 1,739,138 | Giragosian | Dec. 10, 1929 |
| 2,511,353 | Leaf | June 13, 1950 |
| 2,541,328 | Boklep | Feb. 13, 1951 |

FOREIGN PATENTS

| Number | Country | Date |
|---|---|---|
| 260,237 | Great Britain | Feb. 24, 1927 |